US009631839B2

(12) United States Patent
O'Rourke et al.

(10) Patent No.: US 9,631,839 B2
(45) Date of Patent: Apr. 25, 2017

(54) HEAT TRANSFER FLUID HEATING SYSTEM AND METHOD FOR A PARABOLIC TROUGH SOLAR CONCENTRATOR (71) Applicant: Abengoa Solar LLC, Lakewood, CO (US)

(72) Inventors: Deven O'Rourke, Lakewood, CO (US); Nathan Stegall, Lakewood, CO (US); Kerry Manning, Lakewood, CO (US)

(73) Assignee: Abengoa Solar Inc., Lakewood, CO (US)

( * ) Notice: Subject to any disclaimer, the term of this patent is extended or adjusted under 35 U.S.C. 154(b) by 379 days.

(21) Appl. No.: 14/352,525

(22) PCT Filed: Oct. 8, 2012

(86) PCT No.: PCT/US2012/059210
§ 371 (c)(1),
(2) Date: Apr. 17, 2014

(87) PCT Pub. No.: WO2013/059017
PCT Pub. Date: Apr. 25, 2013

(65) Prior Publication Data
US 2014/0270740 A1  Sep. 18, 2014

Related U.S. Application Data (60) Provisional application No. 61/549,674, filed on Oct. 20, 2011.

(51) Int. Cl.
E03B 7/10 (2006.01)
F24J 2/46 (2006.01)
(Continued)

(52) U.S. Cl.
CPC ............ *F24J 2/4632* (2013.01); *F24H 1/105* (2013.01); *F24J 2/055* (2013.01); *F24J 2/14* (2013.01);
(Continued)

(58) Field of Classification Search
None
See application file for complete search history.

(56) References Cited

U.S. PATENT DOCUMENTS 3,293,407 A * 12/1966 Ando ...................... F24H 1/101
138/33
3,975,819 A * 8/1976 Ando ..................... F16L 53/004
219/630

(Continued)

FOREIGN PATENT DOCUMENTS

DE      3603886      8/1987
DE   102008037711   2/2010
(Continued)

OTHER PUBLICATIONS

European Search Report dated Jun. 12, 2015 for corresponding European Application No. 12841628.6.
(Continued)

*Primary Examiner* — Thor Campbell
(74) *Attorney, Agent, or Firm* — Swanson & Bratschun, L.L.C.

(57) ABSTRACT

Methods and systems for providing an impedance heat transfer fluid heating system in association with a parabolic trough solar concentrator are provided. The system includes an intermediate terminal connector that electrically interconnects a receiver tube of the parabolic trough solar concentrator to a power supply. The intermediate terminal connector can include a pair of plates running parallel to the receiver tube. The system additionally includes a pair of end
(Continued)

terminal connectors. Each end terminal connector features a receiver tube plate having an aperture that completely surrounds the receiver tube assembly pipe. The end terminal connectors can additionally include a terminal connector extension that is at an angle to the receiver tube plate. A current return conductor extends between an end terminal connector and the power supply. The current return conductor is supported by the collector frame or structure and/or a receiver tube support structure.

11 Claims, 7 Drawing Sheets

(51) Int. Cl.

| | | |
|---|---|---|
| F24J 2/05 | (2006.01) | |
| F24J 2/14 | (2006.01) | |
| F24J 2/52 | (2006.01) | |
| F24J 2/54 | (2006.01) | |
| F24H 1/10 | (2006.01) | |

(52) U.S. Cl.
CPC ........... *F24J 2/4636* (2013.01); *F24J 2/4649* (2013.01); *F24J 2/5239* (2013.01); *F24J 2/541* (2013.01); *Y02E 10/44* (2013.01); *Y02E 10/45* (2013.01); *Y02E 10/47* (2013.01)

(56) References Cited

U.S. PATENT DOCUMENTS

| | | | |
|---|---|---|---|
| 4,153,039 A | | 5/1979 | Carroll |
| 4,200,148 A * | | 4/1980 | Friefeld ................ F28D 20/021 126/643 |
| 4,243,019 A * | | 1/1981 | Severson .................... F24J 2/14 126/634 |
| 4,515,148 A | | 5/1985 | Boy-Marcotte |
| 5,884,481 A * | | 3/1999 | Johansson ............... F02G 1/055 60/517 |
| 6,031,972 A | | 2/2000 | Barker |
| 6,509,557 B1 | | 1/2003 | Bass |
| 8,895,901 B2 * | | 11/2014 | Wortmann .............. F27D 11/00 219/385 |
| 9,097,437 B2 * | | 8/2015 | Hilliard .................... F24J 2/055 |
| 9,182,470 B2 * | | 11/2015 | Heckendorn ............. F24J 2/38 |
| 2001/0005646 A1 | | 6/2001 | Ness |
| 2004/0231329 A1 | | 11/2004 | Carroll |
| 2005/0109387 A1 * | | 5/2005 | Marshall ................. H02S 10/10 136/253 |
| 2006/0243471 A1 | | 11/2006 | Karlsen |
| 2007/0095340 A1 | | 5/2007 | Kuckelkorn |
| 2010/0043779 A1 | | 2/2010 | Ingram |
| 2010/0175689 A1 | | 7/2010 | Zillmer |
| 2010/0205963 A1 * | | 8/2010 | Ammar .................... F24J 2/055 60/641.15 |
| 2011/0061643 A1 | | 3/2011 | Bohl |
| 2011/0067688 A1 * | | 3/2011 | Reif .......................... F24J 2/06 126/600 |
| 2011/0114079 A1 * | | 5/2011 | Heckendorn .............. F24J 2/38 126/574 |
| 2011/0291405 A1 | | 12/2011 | Burger |
| 2013/0092154 A1 * | | 4/2013 | Lu .............................. F24J 2/18 126/600 |
| 2013/0319501 A1 * | | 12/2013 | Hilliard ................... F24J 2/055 136/246 |
| 2014/0144428 A1 * | | 5/2014 | Eisinger .................... F24J 2/14 126/694 |
| 2014/0366536 A1 * | | 12/2014 | Muren .................... F03G 6/065 60/641.8 |
| 2015/0300326 A1 * | | 10/2015 | Namburi ................. F01K 3/006 60/641.15 |
| 2016/0010895 A1 * | | 1/2016 | Erickson ................... F03G 6/00 60/641.15 |
| 2016/0047212 A1 * | | 2/2016 | Vinegar .............. E21B 43/2401 166/250.01 |
| 2016/0327312 A1 * | | 11/2016 | Viljoen .................... F24J 2/055 |

FOREIGN PATENT DOCUMENTS

| | | |
|---|---|---|
| EP | 2 256 428 | 12/2010 |
| WO | WO 2009/004476 | 1/2009 |

OTHER PUBLICATIONS

Kearney, et al. (2003) Journal of Solar Energy Engineering, 125(2):170, "Assessment of a Molten Salt Heat Transfer Fluid in a Parabolic Trough Solar Field".

Pacheco & Kolb (1997) 1997 ASME International Solar Energy Conference, Washington DC, "Comparison of an Impedance Heating System to Mineral Insulated Heat Trace for Power Tower Applications".

Brosseau, et al. (2007) Sandia National Laboratories, Energy Efficiency and Renewable Energy, "New Sandia Development of Improved Heat Transfer Fluid for Use in Solar Fields and Thermal Storage Sytems".

International Search Report dated May 5, 2013 for corresponding International Application No. PCT/US2012/059210.

Spanish Search Report dated Oct. 8, 2014 for corresponding Spanish Application No. 201490045.

* cited by examiner

HEAT TRANSFER FLUID HEATING SYSTEM AND METHOD FOR A PARABOLIC TROUGH SOLAR CONCENTRATOR

RELATED APPLICATIONS

This application is a 35 U.S.C. §371 national phase application of PCT/US2012/059210 (WO 2013/059017), filed on Oct. 8, 2012, entitled "Heat Transfer Fluid Heating System and Method for a Parabolic Trough Solar Concentrator", which application claims the benefit of U.S. Provisional Application Ser. No. 61/549,674, filed Oct. 20, 2011, which is incorporated herein by reference in its entirety.

CROSS-REFERENCE TO RELATED APPLICATIONS

This application claims the benefit of U.S. patent application Ser. No. 61/549,674, filed on Oct. 20, 2011, the entire disclosure of which is hereby incorporated herein by reference.

FIELD

A system and method for heating a heat transfer fluid within the receiving tube of a parabolic trough solar concentrator are provided.

BACKGROUND

Parabolic trough type solar concentrators utilize a fluid filled receiver tube. The fluid within the receiver tube operates as a heat transfer fluid. Often, the heat transfer fluid is a synthetic oil having a very high thermal capacity. Recent research has indicated that the use of a molten salt as a heat transfer fluid can provide various advantages. However, a molten salt can freeze at higher temperatures than other heat transfer fluids. In a parabolic trough solar concentrator power plant utilizing a heat transfer fluid that freezes at or above ambient temperatures, precautions must be taken to prevent and recover from the freezing of the heat transfer fluid in the pipes. In particular, at night or when the sun is obscured by clouds, the temperature of the heat transfer fluid can drop below its freezing point. For example, certain heat transfer fluids, including some molten salts, need to be maintained at a temperature of at least 160° C. in order to prevent the fluid from freezing.

The receiver tube of a parabolic trough solar concentrator is typically vacuum insulated within a glass envelope. Because of this unique construction, conventional heating techniques, such as heat tracing or resistive wire, are not practical. An alternate technique for heating the receiver tube is an impedance or skin effect heating system. In an impedance heating system, current is fed through metal cross-section of the fluid filled pipe or tube. However, conventional impedance heating systems can be difficult or impractical to implement in connection with a parabolic trough solar concentrator, and can suffer from a relatively short service life. For example, the terminal plate used to provide an electrical interconnection to the receiver tube is usually welded parallel to the length of the receiver tube and is just large enough to make a connection to the cable connecting the terminal plate to the power supply. In a parabolic trough solar concentrator, this type of connection would be impractical due to space constraints and the large amount of sunlight seen along the length of the receiver tube. In addition, the conventional terminal plate design would provide a limited contact area with the receiver tube, and complicates insulating the receiver tube. Conventional techniques would also suffer from a shortened service life due to routing the cable on or in the ground beneath the solar concentrator, which can lead to fatigue related failure of the cable as a result of the movement of the parabolic trough to follow the sun.

SUMMARY

Embodiments of the present invention are directed to solving these and other problems and disadvantages of the prior art. In accordance with embodiments of the present invention, an impedance heat transfer fluid heating system for a parabolic trough solar concentrator is provided that includes a return conductor that is supported by the parabolic trough reflector structure, and/or the receiver tube support structure. The system can additionally include end terminal connectors with receiver tube plates that surround and that are generally perpendicular to the receiver tube at the point of interconnection. The end terminal connectors can additionally include a terminal connection extension structure that is at an angle with respect to the receiver tube plate portion of the end terminal connector. This unique construction facilitates an interconnection to a receiver tube that supports sufficiently high current levels, while positioning an interconnection to the return conductor that is outside of an area of focused sunlight created by the solar concentrator. In accordance with still further embodiments, the system includes an intermediate terminal connector with one or more intermediate terminal connector plates that interconnect an intermediate portion of the receiver tube to a power supply conductor. The intermediate terminal connector plate or plates can also provide mechanical support for the receiver tube. The return conductor and power supply conductor are each electrically interconnected to a power supply, completing the impedance heat transfer fluid heating system circuit.

In accordance with at least some embodiments of the present disclosure, an impedance heat transfer fluid heating system for a parabolic trough solar concentrator is provided that comprises:
a receiver tube assembly, including:
a heat transfer fluid pipe;
a first end terminal connector interconnected to the heat transfer fluid pipe at a first point;
an intermediate terminal connector interconnected to the heat transfer fluid pipe at a second point;
a power supply;
a first current return conductor, wherein a first end of the first current return conductor is electrically interconnected to the first end terminal connector, and wherein a second end of the first current return conductor is electrically interconnected to the power supply, wherein at least most of a length of the first current return conductor is supported by at least one of a frame of the solar concentrator and a receiver tube support structure; and
a first power supply conductor, wherein a first end of the power supply conductor is interconnected to the power supply, and wherein a second end of the power supply conductor is interconnected to the intermediate terminal connector.

The first end terminal connector can include a receiver tube plate, and a receiver tube aperture, wherein the receiver tube aperture is formed in the receiver tube plate, and a terminal connector extension.

In addition, the receiver tube plate can be parallel to a first plane, wherein the terminal connector extension follows an axis that is at a non-zero angle with respect to the first plane.

The heat transfer fluid pipe passes through the receiver tube aperture of the first end terminal connector plate, wherein the first end terminal connector plate is electrically interconnected to the heat transfer fluid pipe, and wherein at the receiver tube aperture the heat transfer fluid pipe is perpendicular to the first plane.

The receiver tube aperture can completely surround the heat transfer fluid pipe.

A shielding member can be provided that is positioned between the solar concentrator and the terminal connector such that the terminal connector is at least partially blocked from light reflected by the solar concentrator.

The shielding member can be attached to at least one of the frame of the solar concentrator and the receiver tube support structure.

The first intermediate connector can include first and second connector plates, wherein the first and second connector plates are electrically interconnected to the heat transfer fluid pipe, and wherein the first and second connector plates provide mechanical support for the receiver tube assembly.

The first current return conductor can be a braided conductor that is at least partially supported by the support structure of the solar concentrator.

The first current return conductor can include an extruded aluminum member that is at least partially supported by the receiver tube support structure.

The system can further include a second end terminal connector, and a second current return conductor, wherein a first end of the second current return conductor is electrically interconnected to the second end terminal connector, wherein a second end of the second current return conductor is electrically interconnected to the power supply, and wherein at least most of a length of the second current return conductor extending between the first and second ends of the first current return conductor is supported by at least one of the frame of the solar concentrator and the receiver tube support structure.

According to still other embodiments, a system is provided, comprising:
an end terminal connector, including:
a receiver tube plate, wherein the receiver tube plate is located within a first plane;
a receiver tube aperture, wherein the receiver tube aperture is formed in the receiver tube plate;
a receiver tube extension, wherein the receiver tube extension extends from the receiver tube plate and is located within a second plane.

The first plane can intersect the second plane.

The system can further include a receiver tube assembly, with a pipe, wherein the receiver tube aperture of the end terminal connector receives and is interconnected to the pipe.

In addition, the system can include an intermediate terminal connector with an intermediate terminal connector plate, wherein the intermediate terminal connector plate is joined to the pipe along a line.

The intermediate terminal connector can include first and second intermediate terminal connector plates, wherein the first and second plates are parallel to one another, and wherein the first and second plates are joined to the pipe along parallel lines.

The system can also include a current return conductor, wherein at least a first end of the current return conductor is interconnected to the receiver tube extension of the end terminal, wherein the current return conductor forms a least a first portion of an electrical circuit, and wherein the pipe forms at least a second portion of the electrical circuit.

The system can also include a power supply cable, wherein a first terminal of the power supply is interconnected to the first and second intermediate terminal conductor plates by the power supply conductor, and wherein a second terminal of the power supply is interconnected to the second end of the current return conductor.

The first and second plates of the intermediate terminal can be joined to a support structure through a bushing.

According to further embodiments of the disclosure, a terminal connector system is provided, comprising:
an intermediate terminal connector, including:
an intermediate terminal connector plate, wherein the intermediate terminal connector plate is joined to a first portion of a receiver tube assembly pipe along a line, and wherein the intermediate terminal connector plate is joined to a support structure through a non-electrically conductive bushing;
an end terminal connector, including:
a receiver tube plate, wherein the receiver tube plate is located within a first plane;
a receiver tube aperture, wherein the receiver tube aperture is formed in the receiver tube plate, and wherein the end terminal connector is joined to a second portion of the receiver tube assembly pipe at the receiver tube aperture;
a receiver tube extension, wherein the receiver tube extension extends from the receiver tube plate and is located within a second plane; wherein the receiver tube assembly pipe includes at least one of a ball joint and a flexible portion.

Additional features and advantages of embodiments of the present invention will become more readily apparent from the following detailed description, particularly when considered together with the accompanying drawings.

DETAILED DESCRIPTION

Figure 1:
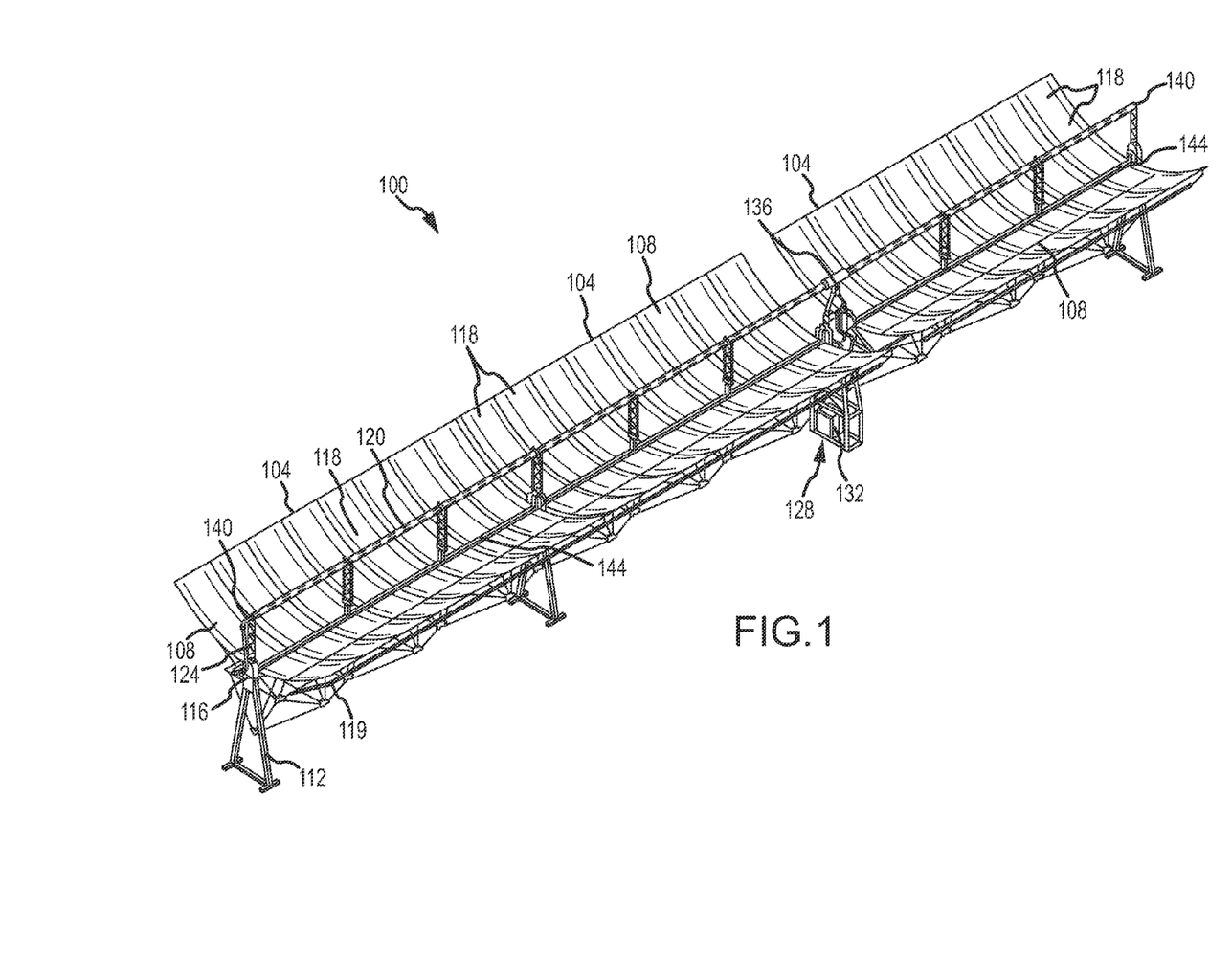
FIG. 1 is a perspective view of a parabolic trough solar concentrator with an impedance heat transfer fluid heating system in accordance with embodiments of the present invention.

FIG. 1 is a perspective view of a parabolic trough solar concentrator assembly or system 100 with an impedance heat transfer fluid heating system 128 in accordance with embodiments of the present invention. In general, the solar concentrator assembly 100 includes a number of modules 104. Each module 104 includes a mirror or reflector 108 mounted to a support structure 112 by pivots 116. The reflector 108 is typically parabolic in cross-section, and can be formed from a plurality of mirror or reflector elements 118 that are supported by a collector frame or structure 119. A receiver tube assembly 120 is suspended adjacent the reflectors 108 by a receiver tube support structure 124.

As can be appreciated by one of skill in the art, the reflectors 108 are rotated about the pivots 116 to track the movement of the sun, to focus the sun onto the receiver tube assembly 120. As can also be appreciated by one of skill in the art, the receiver tube assembly 120 is filled with a heat transfer fluid that is circulated through the receiver tube assembly 120 to enable energy collected from the sun to be used for various purposes, including but not limited to the production of electrical power. The receiver tube assembly 120 can be vacuum insulated within a glass envelope, and can have a special, low emissivity coating. In accordance with embodiments of the present invention, the heat required to prevent freezing of the fluid within the receiver tube assembly 120 is provided by impedance heating, in which an alternating current is applied to the receiver tube assembly 120 in order to heat the receiver tube assembly 120 and the heat transfer fluid contained therein.

In accordance with embodiments of the present invention, the parabolic trough solar concentrator assembly 100 features an impedance heating system 128 with a power supply 132, an intermediate terminal connector 136, and at least one end terminal connector 140. The intermediate terminal connector 136 is electrically interconnected to the power supply 132 by a power supply conductor 224 (see FIGS. 2A and B). Each end terminal connector 140 is electrically interconnected to the power supply 132 by a current return conductor 144. In accordance with further embodiments of the present invention, each current return conductor 144 is supported by the collector frame or structure 119 of the parabolic trough solar concentrator assembly 100. In accordance with at least some embodiments, the power supply 132 can be interconnected to an intermediate connector plate 136 and to first and second end terminal connectors 140, where the intermediate connector plate 136 is interconnected to a receiver tube assembly 120 at a location between the points at which the first and second end terminal connectors 140 are interconnected to the receiver tube assembly 120.

Figure 2A:
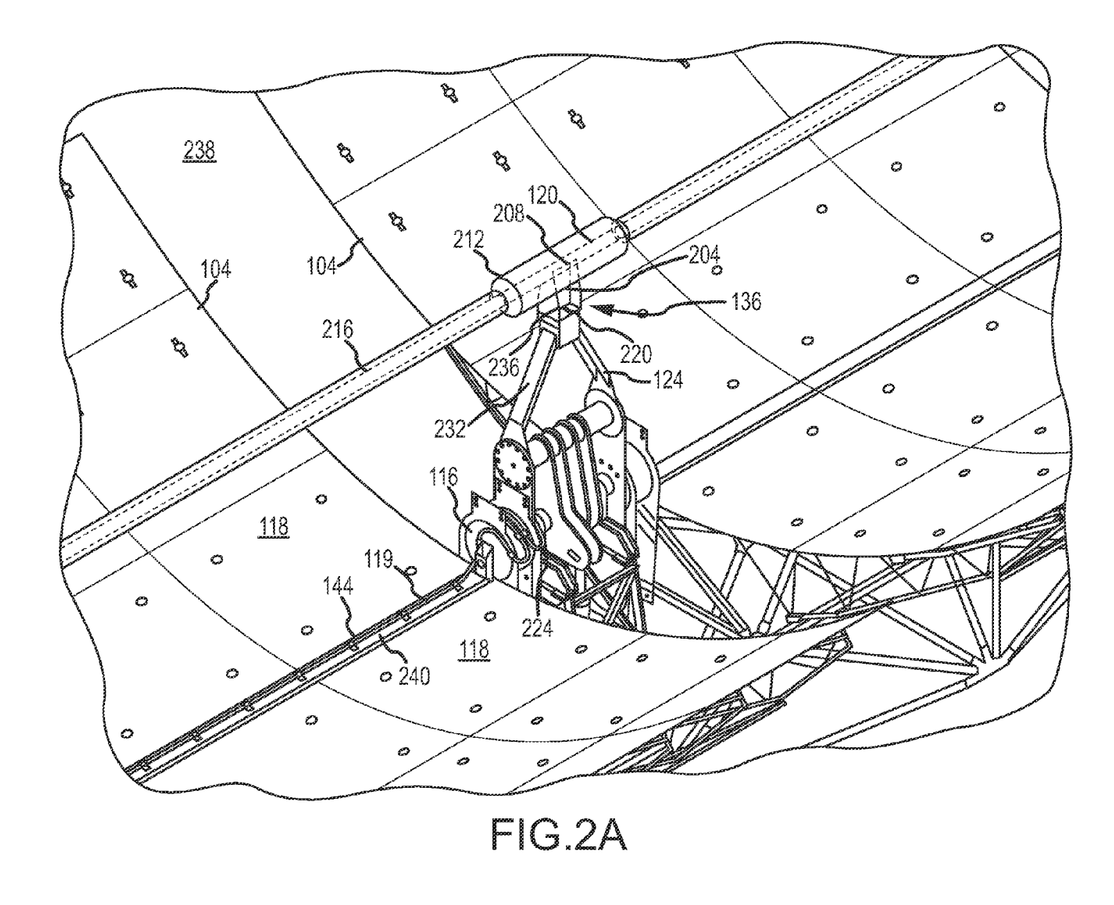
FIG. 2A is a perspective view of an intermediate terminal connector of an impedance heat transfer fluid heating system for a parabolic trough solar concentrator in accordance with embodiments of the present invention.
Figure 2B:
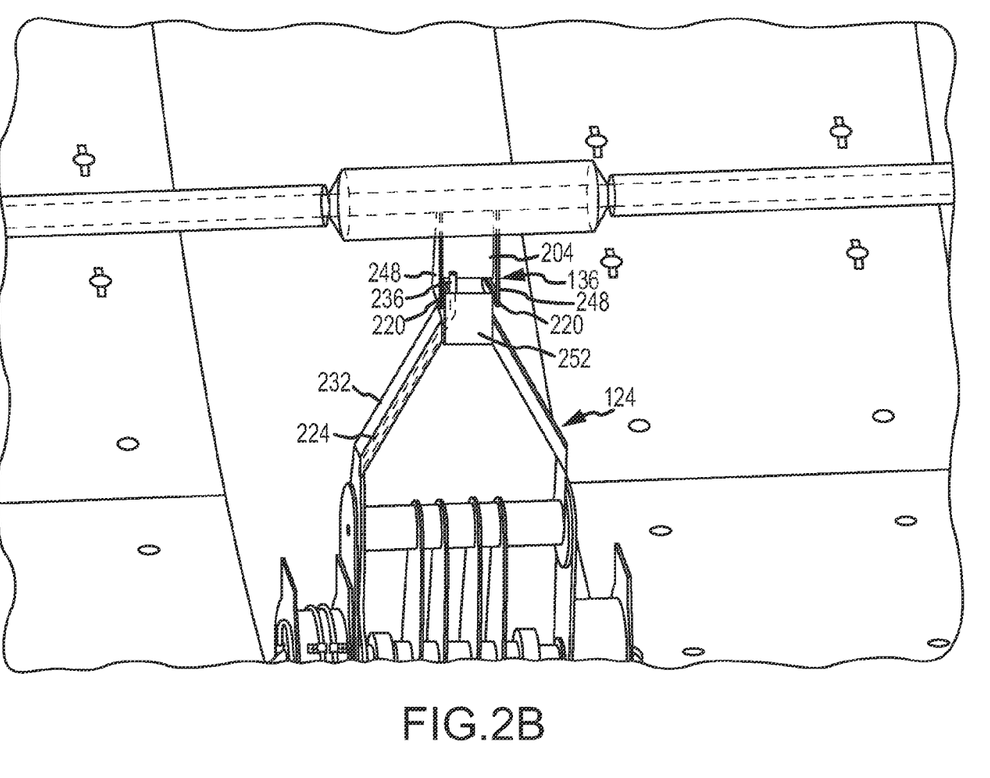
FIG. 2B is another perspective view of an intermediate terminal connector of an impedance heat transfer fluid heating system for a parabolic trough solar concentrator in accordance with embodiments of the present invention.

FIG. 2A illustrates an intermediate terminal connector 136 in accordance with embodiments of the present invention. In general, the intermediate terminal connector 136 includes an intermediate terminal connector plate 204. In accordance with still other embodiments, a plurality, for example a pair, of intermediate terminal connector plates 204 can be provided. More particularly, the intermediate terminal connector plates 204 can be parallel to and spaced apart from one another. FIG. 2 also shows features of the receiver tube assembly 120. In particular, the receiver tube assembly 120 can include thermal insulation 212 and a heat transfer fluid pipe 216. The intermediate terminal connector plate 204 is interconnected to the pipe 216 along a line 208. Where a pair of intermediate terminal plates 204 are provided, they can be interconnected to the pipe 216 along two parallel lines 208 (only one of which is shown in FIG. 2A). As an example, the line or lines 208 can comprise or be coincident with a welded joint. The welded joint can, as illustrated in the figure, be inside the periphery of insulation 212 surrounding the heat transfer fluid pipe 216. Moreover, the intermediate terminal connector plate or plates 204 can be fixed to the receiver tube support structure 124 and can provide mechanical support to the receiver tube assembly 120. In order to electrically isolate the receiver tube support structure 124 from the intermediate terminal connector plate or plates 204, an insulating structure, for example in the form of isolating bushings 220, can be provided. The intermediate terminal connector plate or plates 204 are then interconnected to the power supply 132 by a power supply conductor 224. The power supply conductor 224 can, as shown in the figure, be spooled around the pivot assembly 116 of the associated receiver tube support structure 124, and can be routed within a channel of a support strut 232 provided as part of the receiver tube support structure 124. In addition, the power supply conductor 224 can be interconnected to the intermediate terminal connector 136 at a connection point 236 that is positioned above a gap or space 238 between adjacent modules 104 of the solar concentrator assembly 100. This configuration places the intermediate terminal connector 136 and the power supply conductor 224 outside of an area of focused sunlight.

A current return conductor 144 is also shown in FIG. 2A. In general, the current return conductor 144 is located at or near the center of gravity of the combined reflector 108 and receiver tube assembly 120 structure. In addition, the current return conductor 144 moves with the reflector 108. More particularly, the current return conductor can include portions that are fixed to the collector frame or structure 119. Moreover, the current return conductor 144 can be routed along or adjacent a beam within or underlaying a gap 240 running the length of the reflector 108, between reflector mirror segments 118. The current return conductor 144 is then routed so that it does not interfere with maintenance of the mirror elements, and so that it is outside of the path of reflected sunlight. One end of the current return conductor 144 is interconnected to the power supply 132, while the other end of the current return conductor 144 is interconnected to an end terminal connector 140.

FIG. 2B presents another view of the intermediate terminal connector 136. As shown, the connector plate or plates 204 can be joined to a pair of end plates 248. The end plates 248 can in turn be interconnected to a top member 252 of the receiver tube support structure 124 by the isolating bushings 220. More particularly, the isolating bushings 220 can provide mechanical support for the terminal connector 136, while electrically isolating the terminal connector 136 from the receiver tube support structure 124. The power supply conductor 224 can be interconnected to the connector plate or plates 204 at a connection point 236. Also shown in FIG. 2B as a dotted line is an exemplary routing of the power supply conductor 224 along an interior channel of a support strut 232 of the receiver tube support structure 124.

Figure 3A:
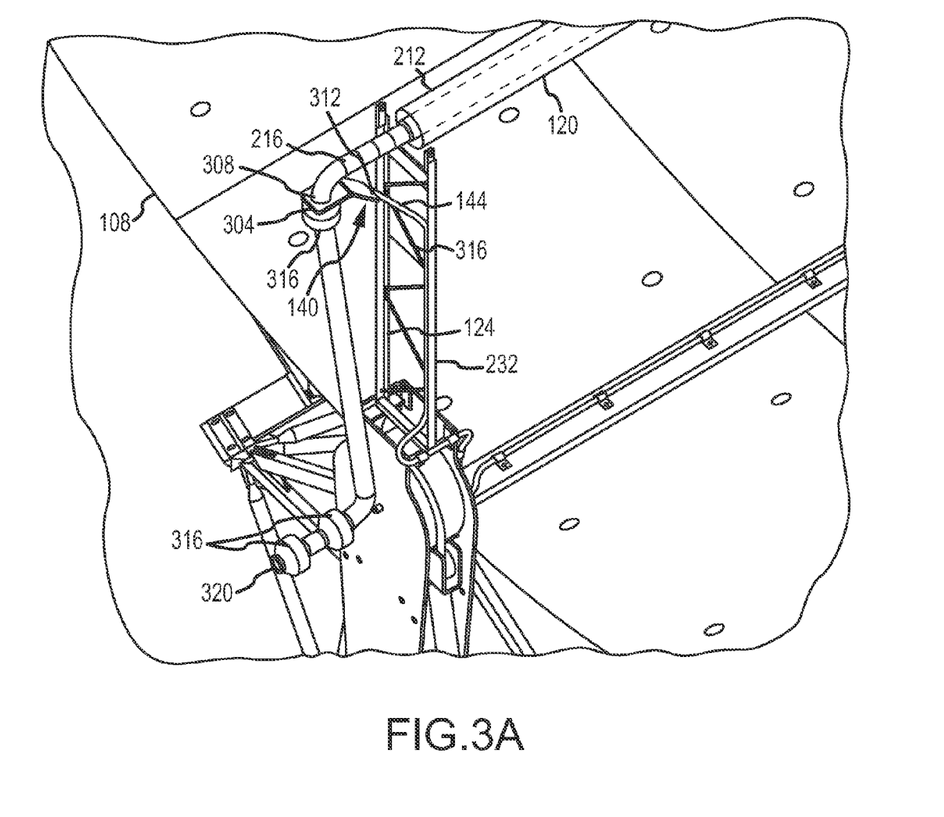
FIG. 3A is a perspective view of an end terminal connector of an impedance heat transfer fluid heating system for a parabolic trough solar concentrator in accordance with embodiments of the present invention.

With reference now to FIG. 3A, an end terminal connector 140 in accordance with embodiments of the present invention is illustrated. The end terminal connector 140 generally includes a receiver tube plate 304 that is electrically interconnected to the receiver tube assembly 120 pipe 216. As shown in the figure, the end terminal connector 140 can be located outside of an area of the receiver tube assembly 120 associated with a vacuum insulated envelope 212.

The receiver tube plate 304 of the end terminal connector 140 can include a receiver tube aperture 308 through which the receiver tube pipe 216 passes. Accordingly, the end terminal connector 140 can completely surround the receiver tube assembly 120. In addition, the receiver tube plate 304 can lie in a plane that is perpendicular to the length or portion of the receiver tube assembly 120 pipe 216 at the point of interconnection. This arrangement can reduce the amount of space along the receiver tube assembly 120 required for the interconnection to the end terminal connector 140 and can simplify the placement of insulation around the connection between the end terminal connector 140 and the receiver tube assembly 120 pipe 216. Moreover, the electrical connection between the end terminal connector 140 and the receiver tube assembly 120 pipe 216 can be completed around the entire circumference of the pipe 216, to provide an electrical connection between the end terminal connector 140 and the receiver tube assembly 120 pipe 216 that has a relatively large area, and that is therefore capable of supporting relatively large electrical currents. In accordance with embodiments of the present invention, the end terminal connector is fixed to the pipe 216 by a welded joint at the intersection between the receiver tube aperture 308 and the pipe 216.

The end terminal connector 140 can additionally include a terminal connector extension 312 that extends from the receiver tube plate 304. The terminal connector extension 312 functions as a heat dump to accommodate thermal limitations of the current return conductor 144. Accordingly, the length of the terminal plate extension 312 can be the length that is calculated to be sufficient to dissipate enough heat to keep the temperature of the current return conductor 144 below the maximum temperature limit of the conductor 144. In addition, a shield 316 can be provided to block concentrated sunlight from hitting the end of the current return conductor 144, and in particular the interconnection point between the end terminal connector 140 and the current return conductor 144. In accordance with embodiments of the present invention, the shield 316 can comprise a metal plate that is mounted to the receiver tube support structure 124. The terminal connector extension 312 can also be angled with respect to the receiver tube plate 304, to further distance the interconnection point from an area of concentrated sunlight, and/or to facilitate the interconnection between the current return conductor 144 and the terminal connector 140. For example, the receiver tube plate 304 may be located within a first plane, while the terminal connector extension 312 may be located within a second plane that is at a non-zero angle with respect to the plane of the receiver tube plate 304. In accordance with at least some embodiments of the present invention, the terminal connector extension 312 is integral to and is formed from the same piece of material as the receiver tube plate 304. In addition, the current return conductor 144 can be routed within a channel or interior angle of a support strut 232 provided as part of the receiver tube support structure 124.

FIG. 3A also shows the inclusion of ball joints 316 in the receiver tube assembly 120. The ball joints 316 provide compliance that can accommodate changes in the length of the pipe 216 as the temperature of the pipe 216 changes, and accommodate rotation of the reflector or collector 108. The current return conductor 144 provides a connection between the power supply 132 and the terminal connector extension 312. Accordingly, the complete electrical circuit of the impedance heating system 128 includes the power supply 132, the power supply conductor 224, the intermediate terminal connector 136 (see FIGS. 1 and 2A), the receiver tube assembly 120 pipe 216, the end terminal connector 140, and the current return conductor 144. As previously noted, the interconnection between the intermediate terminal connector 136 and the power supply conductor 224, and the interconnection between the end terminal connector 140 and the current return conductor 144, are not in areas of concentrated sunlight. In addition, the power supply conductor 224 and/or the current return conductor 144 can be routed along portions of the receiver tube support structure 124 such that they are substantially shielded from direct sunlight.

Figure 3B:
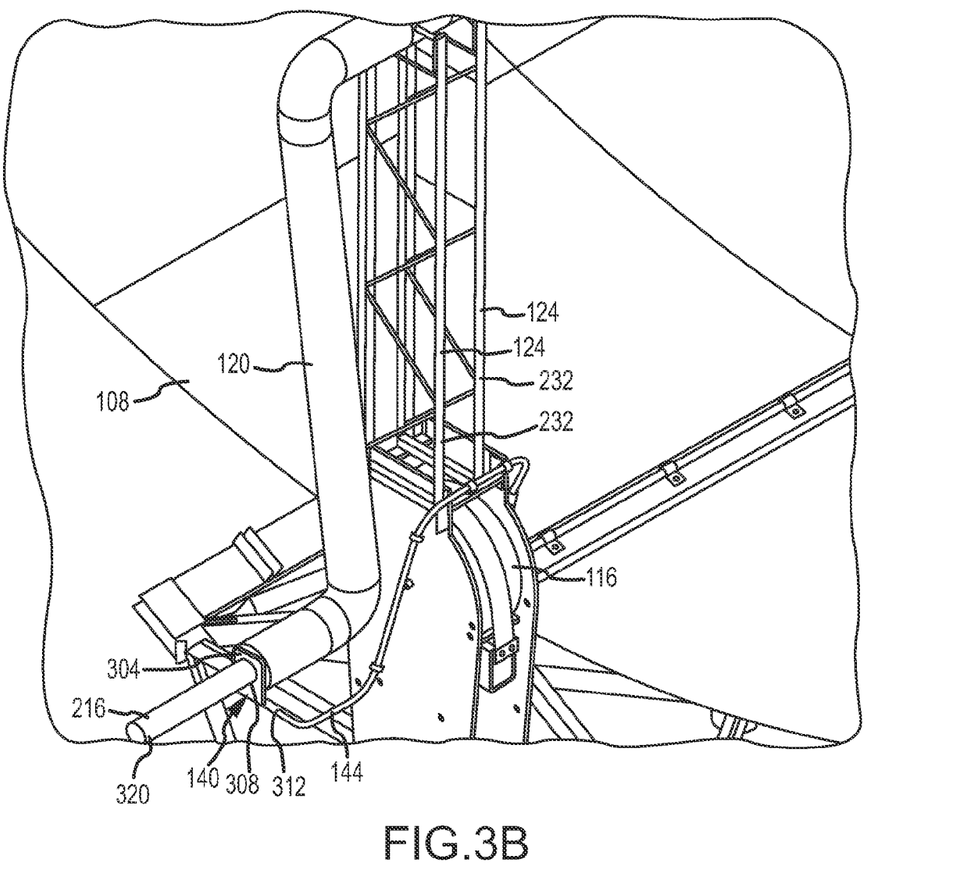
FIG. 3B is another perspective view of an end terminal connector of an impedance heat transfer fluid heating system for a parabolic trough solar concentrator in accordance with other embodiments of the present invention.

FIG. 3B illustrates an end terminal connector 140 in accordance with other embodiments of the present invention. More particularly, in this embodiment, the end terminal connector 140 is interconnected to the receiver tube assembly pipe 216 at a location that is proximate to the pivots 116. This is in contrast to the embodiment shown in FIG. 3A, in which the end terminal connector 140 is interconnected to the pipe 216 at a location near or adjacent the portion of the receiver tube assembly 120 on which the sun is focused by the reflectors 108. Similar to at least some other embodiments, the end terminal connector 140 of the embodiment illustrated in FIG. 3B can include a receiver tube aperture 308 formed therein, and a terminal connector extension 312 that extends from the receiver tube plate 304. Moreover, the receiver tube plate 304 may be located within a plane that intersects a plane containing the terminal connector extension 312. In addition, the terminal connector 140, and in particular the terminal connector extension 312 can be sized such that heat from the receiver tube pipe 216 is less than the maximum temperature limit of the conductor 144, at the point or area of interconnection between the current return conductor 144 and the terminal connector extension 312. The terminal connector extension 312 can be integral to and formed from the same piece of material as the receiver tube plate 304.

FIG. 3B also shows a receiver tube assembly 120 that does not include any ball joints. In such an embodiment, at least a portion of the pipe 216 may comprise a flexhose, in order to accommodate changes in the length of the pipe 216 with changes in temperature. In addition, the receiver tube assembly 120 can include or be associated with a rotary joint, for example to accommodate rotation of an end or portion 320 of the pipe 216 that accompanies rotation of the reflector 108 about the pivots 116.

Figure 4:
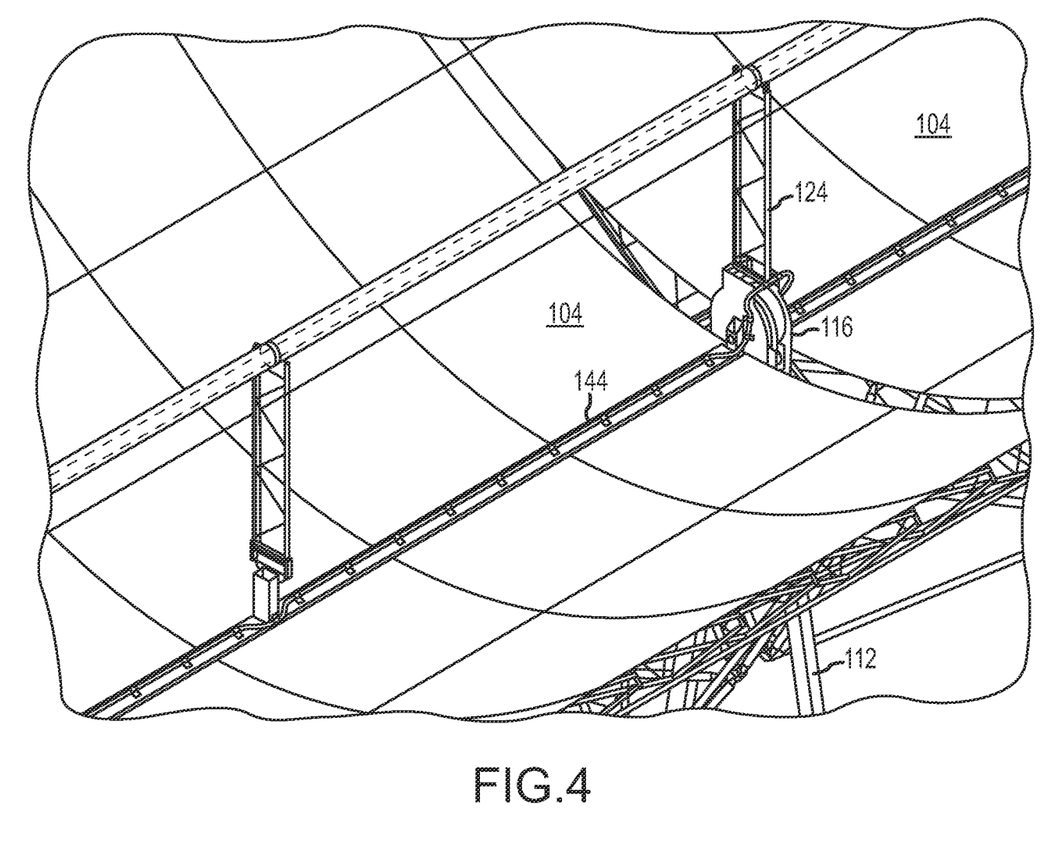
FIG. 4 illustrates an exemplary routing of a current return conductor between modules of a parabolic trough solar concentrator in accordance with embodiments of the present invention.

FIG. 4 illustrates an exemplary routing of a current return conductor 144 between adjacent modules 104 of a parabolic trough solar concentrator assembly 100 in accordance with embodiments of the present invention. In particular, the current return conductor 144 can be routed across a pivot 116 associated with the support structure 112.

Figure 5:
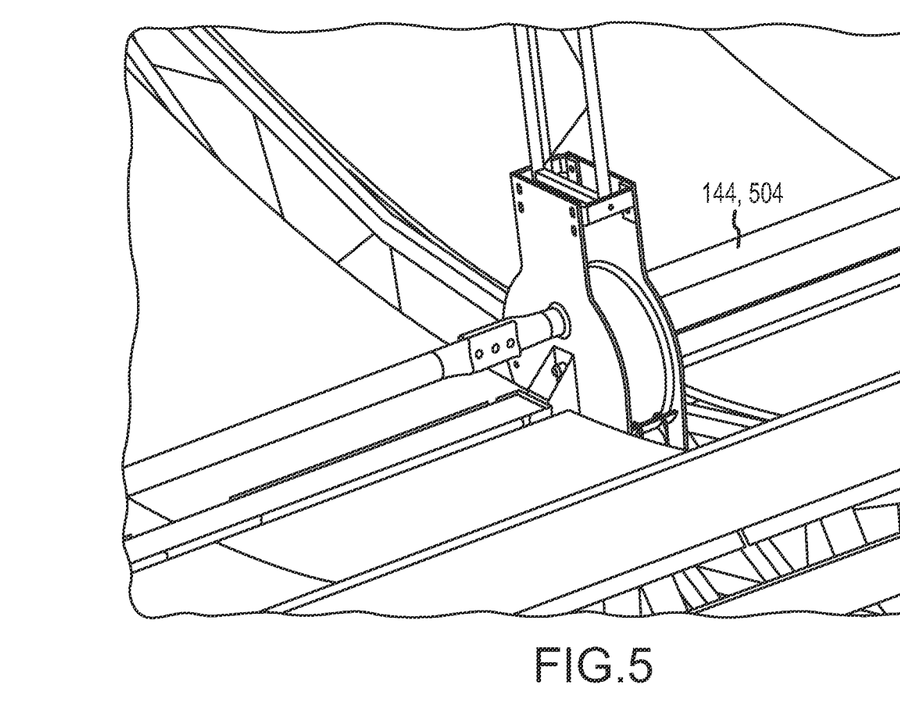
FIG. 5 illustrates a current return conductor comprising an extruded section in accordance with other embodiments of the present invention.

With reference now to FIG. 5, a current return conductor 144 that at least partially comprises a solid and/or rigid conductor 504 is illustrated. The use of a solid conductor, such as a length of extruded aluminum, can provide a lower cost and lighter weight assembly as compared to alternatives in which the entire current return conductor 144 is formed from an insulated, flexible cable. In accordance with further embodiments of the present invention, the return conductor 144 may be routed around rather than through support structures 112, to prevent currents from being induced in the support structures.

As can be appreciated by one of skill in the art after consideration of the description provided herein, embodiments of the present invention provide an impedance heating system 128 with various features that facilitate the electrical heating of a heat transfer fluid of a parabolic trough solar concentrator system 100. These include features that facilitate electrical interconnections between the receiver tube assembly 120 pipe 216 and other components of the impedance heating system 128. Moreover, these interconnections can be accomplished while avoiding or reducing interference with receiver tube assembly 120 insulation 212, as compared to alternate configurations. In addition, embodiments of the present invention provide for a current return conductor 144 in which fatigue is reduced or eliminated. In particular, by providing a current return conductor 144 that is supported by the reflector 108 and/or the receiver tube support structure 124, the current return conductor 144 moves with the moveable components of the parabolic trough solar concentrator system 100. Accordingly, the current return conductor 144 only needs to accommodate relative movement between components of the parabolic trough solar concentrator system 100 at limited locations. These locations include the endpoints of the solar concentrator assembly 100, in order to accommodate the thermal expansion and contraction of the receiver tube assembly 120. In addition, relative movement between the portions of the current return conductor 144 and the power supply conductor 224 that are supported by the moveable components of the solar concentration assembly 100 and the power supply 132 may need to be accommodated, for example where the power supply 132 is mounted to the ground. Installation costs can also be reduced as compared to alternate systems, for example by providing a current return conductor 144 that is not buried in the ground underlaying the solar concentrator system 100.

For purposes of illustration, and without limitation, a power supply 132 in accordance with embodiments of the present invention may comprise a 60 Hz, 24V AC power supply. The current return 144 and power supply 224 conductors can comprise insulated, 535MCM braided copper cables.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. An impedance heat transfer fluid heating system for a parabolic trough solar concentrator, comprising:
   a receiver tube assembly, including:
      a heat transfer fluid pipe;
      a first end terminal connector interconnected to the heat transfer fluid pipe at a first point;
      an intermediate terminal connector interconnected to the heat transfer fluid pipe at a second point;
      a power supply;
      a first current return conductor, wherein a first end of the first current return conductor is electrically interconnected to the first end terminal connector, and wherein a second end of the first current return conductor is electrically interconnected to the power supply, wherein at least most of a length of the first current return conductor is supported by at least one of a frame of the solar concentrator and a receiver tube support structure; and
   a first power supply conductor, wherein a first end of the power supply conductor is interconnected to the power supply, and wherein a second end of the power supply conductor is interconnected to the intermediate terminal connector.

2. The system of claim 1, wherein the first end terminal connector includes:
   a receiver tube plate;
   a receiver tube aperture, wherein the receiver tube aperture is formed in the receiver tube plate;
   a terminal connector extension.

3. The system of claim 2, wherein the receiver tube plate is parallel to a first plane, and wherein the terminal connector extension follows an axis that is at a non-zero angle with respect to the first plane.

4. The system of claim 3, wherein the heat transfer fluid pipe passes through the receiver tube aperture of the first end terminal connector plate, wherein the first end terminal connector plate is electrically interconnected to the heat transfer fluid pipe, and wherein at the receiver tube aperture the heat transfer fluid pipe is perpendicular to the first plane.

5. The system of claim 4, wherein the receiver tube aperture completely surrounds the heat transfer fluid pipe.

6. The system of claim 4, further comprising:
   a shielding member, wherein the shielding member is positioned between the solar concentrator and the terminal connector such that the terminal connector is at least partially blocked from light reflected by the solar concentrator.

7. The system of claim 6, wherein the shielding member is attached to at least one of the frame of the solar concentrator and the receiver tube support structure.

8. The system of claim 4, wherein the first intermediate connector includes:
   first and second connector plates, wherein the first and second connector plates are electrically interconnected to the heat transfer fluid pipe, and wherein the first and second connector plates provide mechanical support for the receiver tube assembly.

9. The system of claim 1, wherein the first current return conductor is a braided conductor and is at least partially supported by the support structure of the solar concentrator.

10. The system of claim 1, wherein the first current return conductor includes an extruded aluminum member that is at least partially supported by the receiver tube support structure.

11. The system of claim 1, further comprising:
   a second end terminal connector;
   a second current return conductor, wherein a first end of the second current return conductor is electrically interconnected to the second end terminal connector, wherein a second end of the second current return conductor is electrically interconnected to the power supply, and wherein at least most of a length of the second current return conductor extending between the first and second ends of the first current return conductor is supported by at least one of the frame of the solar concentrator and the receiver tube support structure.

\* \* \* \* \*